Nov. 13, 1951   G. H. BOCKIUS ET AL   2,574,523
FILING APPLIANCE

Filed Oct. 15, 1945   10 Sheets-Sheet 1

Inventors
George H. Bockius and
Clarence E. Erickson
By Frease and Bishop
Attorneys Inventors
George H. Bockius and
Clarence E. Erickson
By Frease and Bishop
Attorneys Nov. 13, 1951  G. H. BOCKIUS ET AL  2,574,523
FILING APPLIANCE
Filed Oct. 15, 1945  10 Sheets-Sheet 3

Inventors
George H. Bockius and
Clarence E. Erickson
By Frease and Bishop
Attorneys

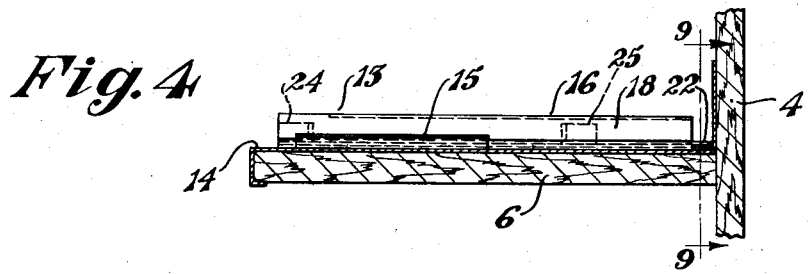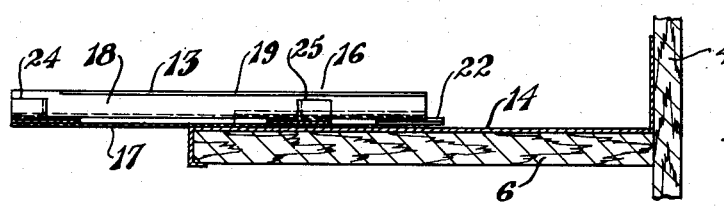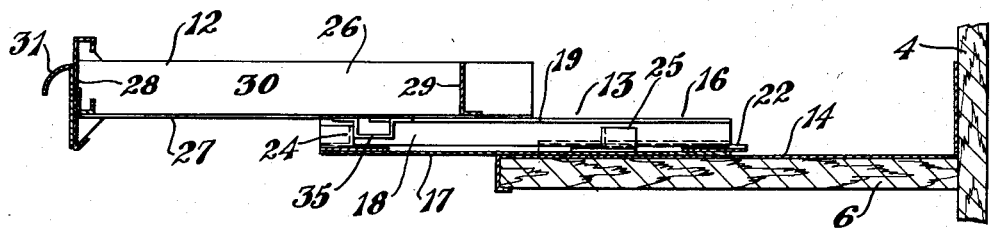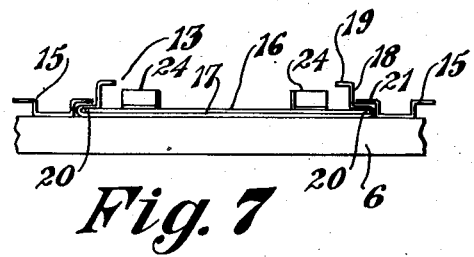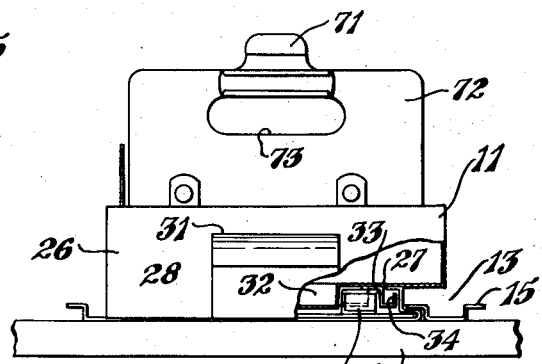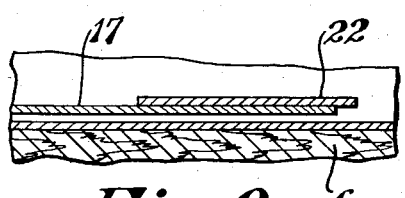

Nov. 13, 1951   G. H. BOCKIUS ET AL   2,574,523
FILING APPLIANCE
Filed Oct. 15, 1945   10 Sheets-Sheet 5

Inventors
George H. Bockius and
Clarence E. Erickson

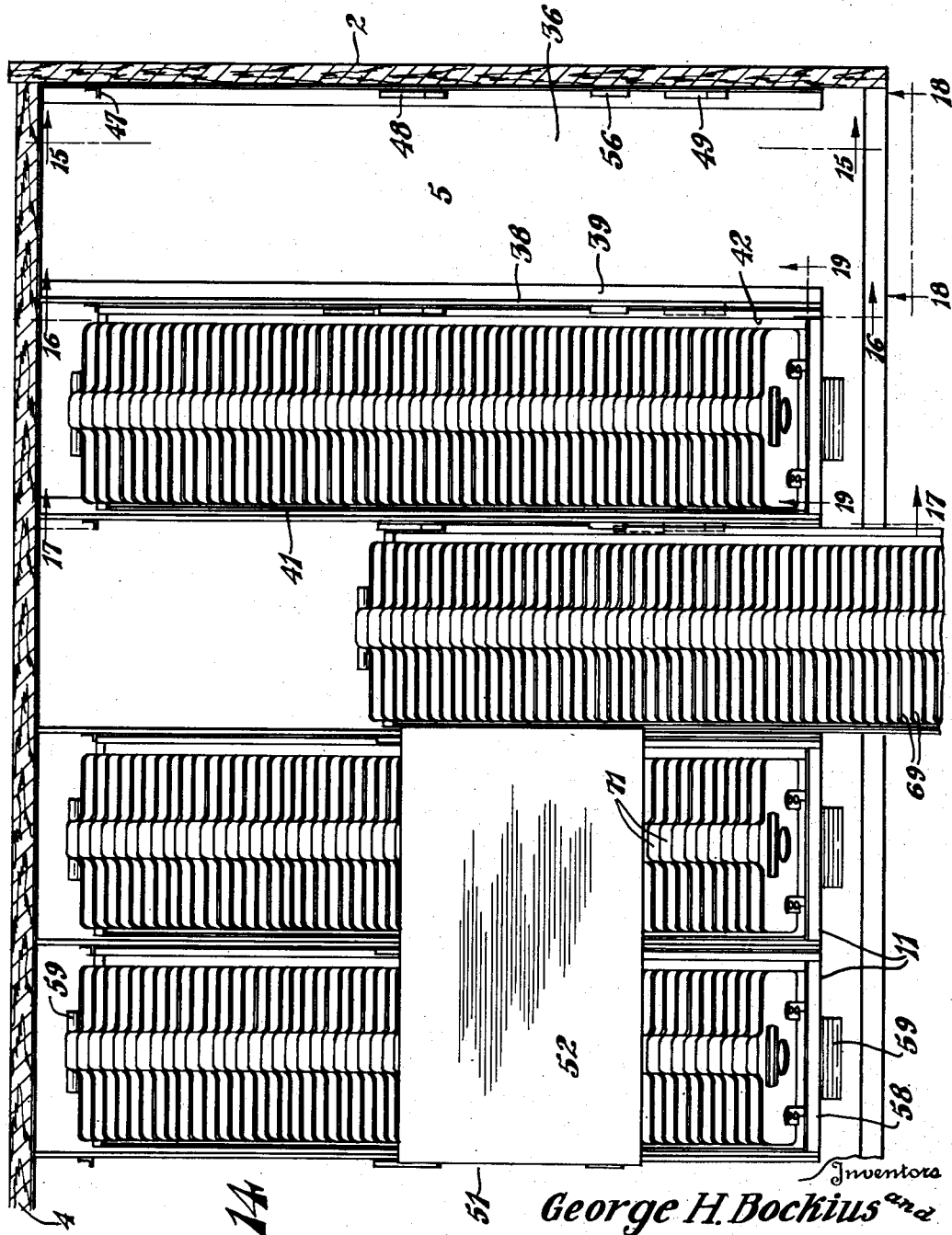

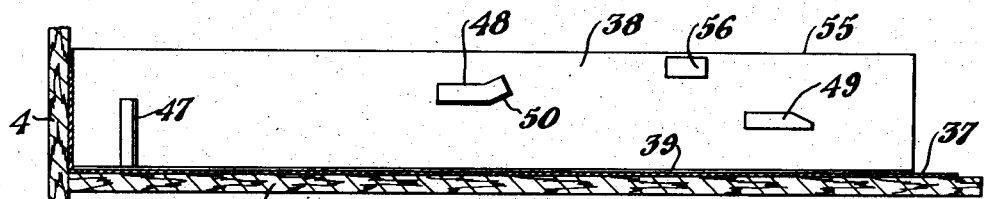
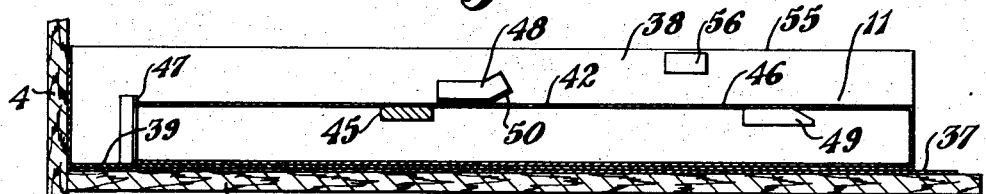
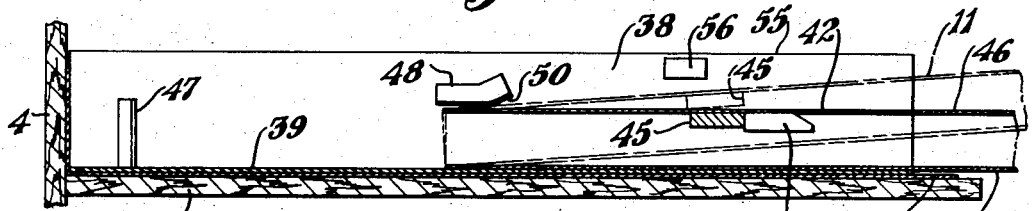
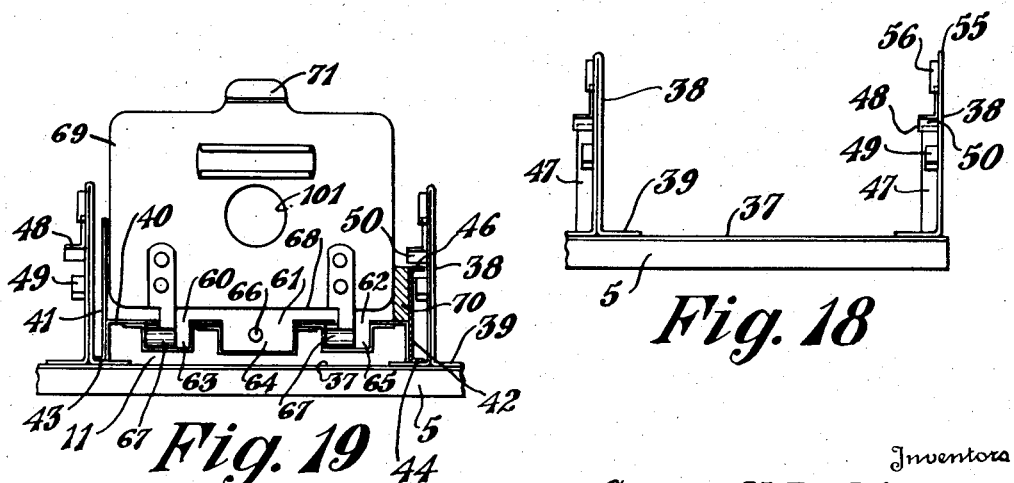

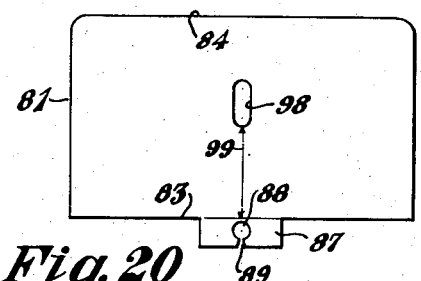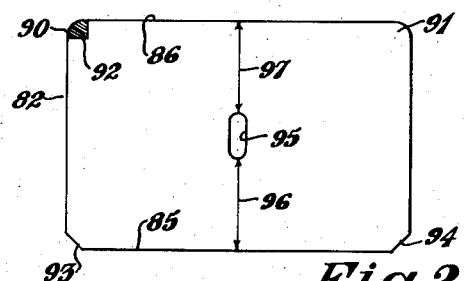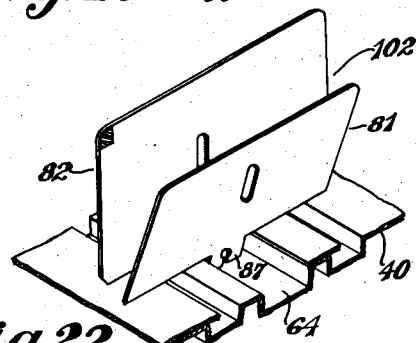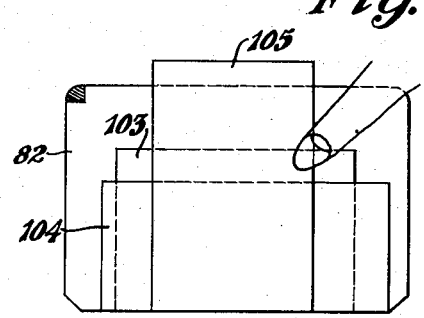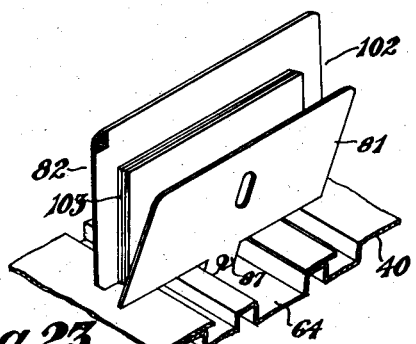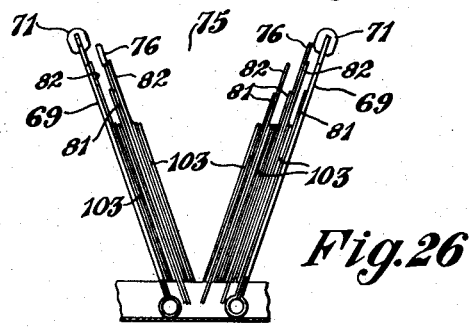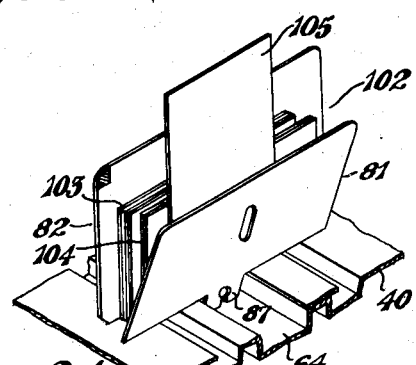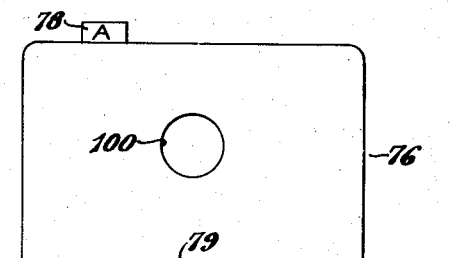

Inventors
George H. Bockius and
Clarence E. Erickson

Nov. 13, 1951 — G. H. BOCKIUS ET AL — 2,574,523
FILING APPLIANCE
Filed Oct. 15, 1945 — 10 Sheets-Sheet 10

Inventors
George H. Bockius and
Clarence E. Erickson

Patented Nov. 13, 1951

2,574,523

UNITED STATES PATENT OFFICE 2,574,523

FILING APPLIANCE

George H. Bockius and Clarence E. Erickson, Canton, Ohio, assignors to Diebold, Incorporated, Canton, Ohio, a corporation of Ohio Application October 15, 1945, Serial No. 622,297

8 Claims. (Cl. 45—2)

1

The invention relates to filing appliances, and more particularly to a card index type of filing apparatus for use in connection with that type of bookkeeping and billing system known as "Cycle Billing."

The problem of bookkeeping and billing charge accounts in large department stores where thousands, tens of thousands, and even hundreds of thousands of accounts are involved, is tremendous. Sales or credit slips must be sorted, and posted or temporarily stored, and active accounts are usually billed once each month. Credit history and control is involved for each account.

Some of the difficulties heretofore encountered in the proper, satisfactory and efficient operation of the bookkeeping and billing departments and the like in large institutions such as large department stores have been eliminated by utilizing a system or procedure known as cycle billing. The cycle billing procedure eliminates individual posting of sales or credit items, and temporarily stores sales or credit slips and other items for each particular account until the particular billing date for that account. On the billing date, the accumulated sales and credit slips are totaled on a bookkeeping machine, and the amounts and totals are entered on an invoice to the customer and on the ledger or credit history card for the particular account. The sales and credit slips are usually attached to the invoice and are mailed to the customer with the invoice.

Likewise, the cycle billing procedure involves the billing of certain accounts on certain dates and other accounts on other dates. Thus, the A to C accounts may be billed on the first and second of the month and the D to F accounts may be billed on the fourth and fifth of the month, etc. On billing days, the particular accounts involved are moved to a bookkeeping department where the bookkeeping work for each account is performed, one account at a time.

Fundamentally, the cycle billing system or procedure is intended to be a time and error saving system. Therefore, in order to obtain the full benefits and advantages of and to facilitate the operation of the cycle billing procedure, the filing equipment used in connection therewith should be time and error saving in operation.

There are other complicating factors involved in all charge account bookkeeping and billing systems. Thus, a certain percentage of accounts are normally active every month. Another percentage of accounts are active only throughout a portion of a year. Still another percentage of accounts are only active infrequently and are therefore normally classed as inactive accounts.

2

With all types of accounts, there is usually a greater volume of activity during a certain few months of the year than during the remainder of the year.

These matters of account activity and volume of activity must be taken into consideration in the design and efficient operation of any filing appliance for any charge account bookkeeping and billing system if time is to be saved and errors avoided in the operation of any such system.

Insofar as we are advised, there is no prior known filing apparatus or appliance capable of fully satisfactory use in connection with the cycle billing procedure and adapted to obtain the full benefits thereof from the standpoint of time and error savings.

Attempts have been made to adapt prior filing appliances for use in the cycle billing procedure but no substantial savings in time, as contemplated by the cycle billing procedure, is obtained by the use of such prior filling appliances. Likewise, if an error is discovered in balances on bookkeeping machine at the billing time, where prior filing appliances are used in carrying out the cycle billing procedure, it is necessary to individually search or inspect every account in an attempt to locate the source of the error.

In order to attain the full benefits and advantages of the cycle billing procedure, the filing equipment used therewith should, among others, have the following principle characteristics:

1. Active accounts should be readily and equally available with a minimum amount of effort and within easy reach of a seated operator working on the accounts so as to enable the operator to gain full access to any account substantially instantaneously when found.

2. All active accounts for one operator should have at least index visibility on one level within easy reach to facilitate rapidly finding any individual account.

3. Inactive accounts should be filed separately but readily accessible adjacent the location of active accounts for the same index range.

4. The filing apparatus should lend itself to adequate lighting, visibility, ventilation and supervision.

5. Each separate account and all groups of accounts should be capable of substantial expansion to take care of increased account activity and increased numbers of active accounts during peak seasons.

6. An increase in the number of accounts in any group should be accomplished with a minimum disturbance of or shifting of old accounts.

7. Normally, no drawers should be required to be opened or closed to gain access to any active account.

8. All credit application and history data should be capable of ready exposure for reference.

9. All writing on account records when necessary should be done with a minimum of effort in a natural desk top manner by the operator.

10. All accounts should be accessible to open direct top filing or stuffing in a work space created by fanning between dividers so that charge and credit slips and other material can be stuffed in any individual account with a minimum number of motions so as to reduce fatigue to operator and increase speed of stuffing.

11. All accounts for a single operator should be accessible within easy reach in a seated position without stretching, stooping, bending or squatting.

12. The necessity of fine sorting in addition to rough sorting for filing or stuffing charge or credit slips or the like should be eliminated in many instances.

13. Each account should be capable of unmistakable and easily understood signalling for credit, authorization, collection, or control.

14. Groups of accounts should be capable of easy transportation as filed in the filing container or tray between a filing department and a bookkeeping department or machine without requiring operations of stripping individual accounts from or refiling them in the filing appliance.

15. Each account should be adapted for receiving an addressed billhead for removal at a bookkeeping machine with sales and credit slips and the account history or ledger card, without disturbing the permanent location of any individual account in the account filing apparatus.

16. Every tray or container for a group of accounts should be capable of instant sight inspection of its entire contents for detecting overlooked stuffed material before such tray is removed from a bookkeeping machine.

17. The possibility of mixing stuffed material of one account with that of another upon removal of any account ledger card should be eliminated.

18. Signalling of account inactivity should be possible without the requirement of applying extra or special signal devices.

Accordingly, it is an object of the present invention to provide a new card index type account filing apparatus especially adapted for use in and to obtain the full advantages of the cycle billing procedure.

Furthermore, it is an object of the present invention to provide a new card index type account filing apparatus which incorporates each and all of the above enumerated features desired for efficient operation of the cycle billing procedure.

Moreover, it is an object of the present invention to provide a new card index type account filing apparatus for use in connection with the cycle billing procedure which eliminates the described difficulties and disadvantages encountered in attempts to use prior filing equipment in connection with cycle billing procedure.

Also, it is an object of the present invention to provide a new card index type account filing appliance which in use avoids errors, saves time and facilitates the operation of the cycle billing procedure.

Furthermore, it is an object of the present invention to provide a new card index type filing apparatus for charge account sales and credit slips and the like, which exposes approximately five thousand active accounts to instant access by a single operator within easy reach on one level without requiring the operator to move from a seated position.

Moreover, it is an object of the present invention to provide a new card index type account filing appliance which houses inactive accounts separate from but adjacent a similar group of exposed active accounts in the same index range.

Also, it is an object of the present invention to provide a new card index type account filing appliance which exposes and renders accessible to a single operator a large number of say up to five thousand active accounts normally without opening or closing any drawers for gaining access to any such accounts.

Likewise, it is an object of the present invention to provide a new card index type account filing appliance in which every account is individually segregated, and material may be readily stuffed to each individual account and maintained segregated from other stuffed material, and in which stuffing may be performed by the simple direct top filing operation of dropping stuffed material into its particular account by fan-opening the account.

Furthermore, it is an object of the present invention to provide a new card index type account filing apparatus including a plurality of trays having cards edge-filed therein and indexed at the top on one level, all within easy reach of a seated operator and adapted for receiving stuffed material, and in which any tray with its edge mounted cards and stuffed material may be readily transported to a bookkeeping machine.

Also, it is an object of the present invention to provide a new card index type account filing apparatus having individual accounts adapted for receiving stuffed material and including a tray in which a group of account cards and stuffed material are contained, wherein material once stuffed is normally not thereafter removed from the tray until the operator of a bookkeeping machine removes the same for billing, thus reducing the possibility of loss.

Moreover, it is an object of the present invention to provide an improved card index type account filing appliance including a plurality of trays for containing account cards and stuffed material, in which the entire contents of each tray may be instantly sight inspected for the presence of any stuffed material when all stuffed material should have been removed, as upon completion of billing the accounts contained in the tray at a bookkeeping machine.

Furthermore, it is an object of the present invention to provide an improved card type account construction and arrangement for individual accounts adapted for receiving stuffed material comprising two cards edge-mounted in a tray, in which one of the two cards is semi-permanently mounted in the tray to form a permanent divider between accounts and the other of the two cards is removably mounted in the tray; so that stuffed material can be inserted between the two cards of each account, and so that the stuffed material and one card can be removed for billing.

Also, it is an object of the present invention to provide an improved filing appliance and an improved account structure having a simplified construction and arrangement which may be readily manufactured and assembled by the simplest of operations.

Finally, it is an object of the present invention to provide an improved filing appliance and an improved account structure which are durable and effective in use, which overcomes the foregoing prior art difficulties and solve problems existing in the art, and which incorporate one or more or all of the foregoing advantages and desiderata.

These and other objects and advantages apparent to those skilled in the art from the following description and claims may be obtained, the stated results achieved, and the described difficulties overcome, by the devices, arrangements, elements, parts, constructions, combinations, sub-combinations, filing appliances, and account structures which comprise the present invention, the nature of which are set forth in the following general statements, preferred embodiments of which—illustrative of the best modes in which applicants have contemplated applying the principles—are set forth in the following description, and which are particularly and distinctly pointed out and set forth in the appended claims forming part hereof.

The nature of the improvements in filing appliance for use in connection with that type of bookkeeping and billing system known as "cycle billing" may be stated in general terms as including in card index type account filing apparatus, desk means including a table member and a shelf member above the rear portion of the table member; a first series of elongated top opening trays arranged side by side on the table member, means mounting each of said first series of trays for sliding movement on the table member longitudinally of the trays, means normally limiting the extent of said sliding movement, said last mentioned means being constructed and arranged to permit removal of the trays from the table member and to prevent drop-tilting of the trays when the same are mounted or slid on the table member; a second series of top opening trays arranged side by side on said shelf member, means mounting each of said second series of trays for movement on the shelf member longitudinally of the trays to positions above the central portions of the first series of trays; a series of card account structures edge-mounted in said first series of trays, each card account structure including two adjacent cards, means semi-permanently mounting one of the two cards of each card account structure in said trays, the other card of each card account structure being readily removable from said trays, the mounting of said card account structures in said trays being constructed to provide a V-opening between said two cards of any selected card account structure upon fanning the series thereof in any tray for receiving stuffed material, index means for said series of card account structures; means for edge-mounting any card account structure removed from said first series of trays in any tray of the second series; index means in said second series of trays; preferably a support member for material to be stuffed in said card account structures selectively supported on said table member for longitudinal movement above any of said trays of said first series and below said shelf member; preferably cover means for enclosing both series of trays on said table and shelf members; divider means in each tray of each series for supporting the card therein in edge-mounted position; the cards, index means, and dividers in each tray of each series being formed with aligned openings; and the index means for all trays in the first series being visible on one level.

The nature of the improvements in account structures may be stated in general terms as including two cards for an individual account, means for semi-permanently edge-mounting one of the two cards in a top opening tray, means for removably edge-mounting the second card in said top opening tray adjacent the first card, the first card preferably having a height shorter than the second card, the second card preferably being provided with signal indicia at least one top corner on each side, the second card being provided with different signal indicia at its bottom corners on both sides, the second card being provided with an opening, the first card being provided with an opening registering with said second card opening whether the second card is turned upside down or end for end or both, the two cards being adapted for receiving any amount of stuffed material therebetween upon fan opening said cards, and means for mounting said cards in a tray constructed to permit fan opening of the cards to provide a top opening V-shaped space therebetween for receiving material to be stuffed to any account formed by its two cards.

By way of example, preferred embodiments of the improved card index type account filing apparatus and of the improved card type account structure are illustrated in the accompanying drawings forming part hereof wherein:

Fig. 4 is a section looking in the direction of the arrows 4—4, Fig. 3 illustrating one position of the pan suspension for one upper tray drawer;

Fig. 5 is a view similar to Fig. 4 taken on the line 5—5, Fig. 3, illustrating the extended position of a pan suspension;

Fig. 6 is a view similar to Fig. 5 taken on the line 6—6, Fig. 3 but showing a drawer mounted on the pan suspension;

Fig. 7 is a front view of the pan suspension looking in the direction of the arrows 7—7, Fig. 3;

Fig. 8 is a front view of one upper tray mounted in its drawer looking in the direction of the arrows 8—8, Fig. 3;

Fig. 9 is a fragmentary view illustrating the stop for a pan suspension taken on the line 9—9, Fig. 4;

Fig. 14 is a plan view taken on the line 14—14, Fig. 1, illustrating the arrangement of lower trays on the table member of the filing apparatus;

Fig. 15 is a section taken on the line 15—15, Fig. 14, illustrating the mounting and control means on the table member for one of the lower trays;

Fig. 16 is a view similar to Fig. 15 taken on the line 16—16, Fig. 14, but illustrating a tray in normal position;

Fig. 17 is a view similar to Figs. 15 and 16 taken on the line 17—17, Fig. 14, illustrating a tray in full lines in extended position and in dot-dash lines in extended tilted position for removal;

Fig. 18 is a view looking in the direction of the arrows 18—18, Fig. 14, illustrating one of the ways for one of the trays;

Fig. 19 is a view similar to Fig. 18 taken on the line 19—19, Fig. 14, and illustrating one of the lower trays in cross section;

Fig. 20 is a front elevation of the semi-permanently mounted card of each improved card account structure;

Fig. 21 is a view similar to Fig. 20 of the second removable card of each improved card account structure;

Fig. 22 is a fragmentary diagrammatic perspective view illustrating the relation between the two cards of Figs. 20 and 21 of the improved card account structure in open-V edge-mounted position for receiving material to be stuffed to the account structure formed by said cards;

Fig. 23 is a view similar to Fig. 22 illustrating material stuffed in an individual account structure;

Fig. 24 is a view similar to Fig. 23 illustrating two different types of material stuffed in an individual account structure;

Fig. 25 is a view illustrating the card of Fig. 21 and the stuffed material of Fig. 24 being removed from an individual account at a bookkeeping machine for billing;

Fig. 26 is an exaggerated somewhat diagrammatic side view illustrating the relative arrangement of cards of several improved account structures, index means therefor, and divider means therefor; and material stuffed in each individual account together with the V-opening formed between two cards of one individual account by fanning for receiving stuffed material;

Fig. 29 is a front elevation of an index card which may be used in the improved filing appliance.

Similar numerals refer to similar parts throughout the various figures of the drawings.

Figure 1:
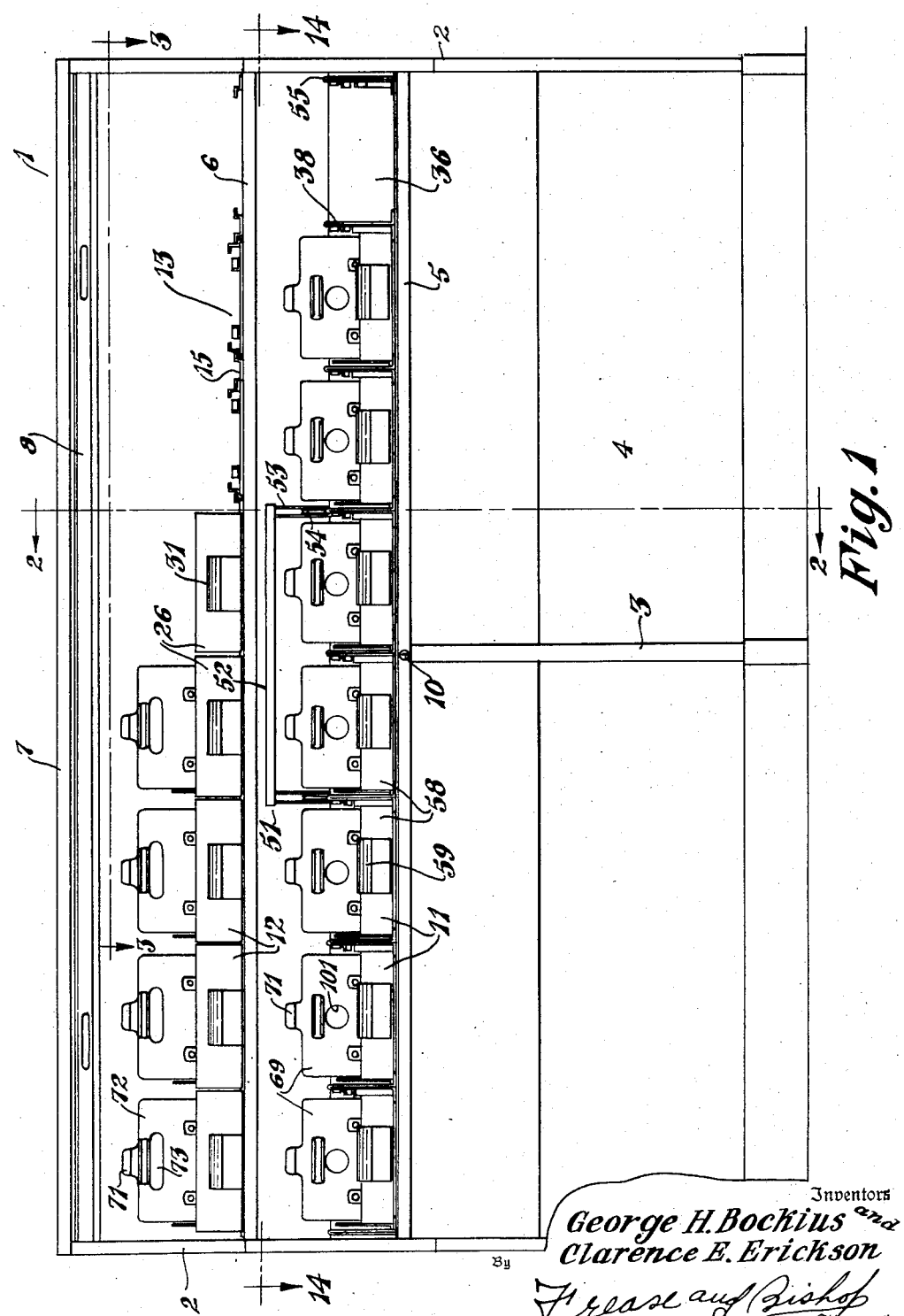
Figure 1 is a front elevation, with certain parts removed, of the improved filing apparatus.

The improved filing apparatus is indicated generally at 1 and includes a desk-like cabinet having side walls 2, preferably an intermediate support wall 3, a rear wall 4, a table member 5, a shelf member 6, a top member 7, and preferably a roll top closure 8 running in ways 9 formed in the side walls 2. Means 10 may be provided for locking the roll top 8 in the usual manner.

Figure 2:
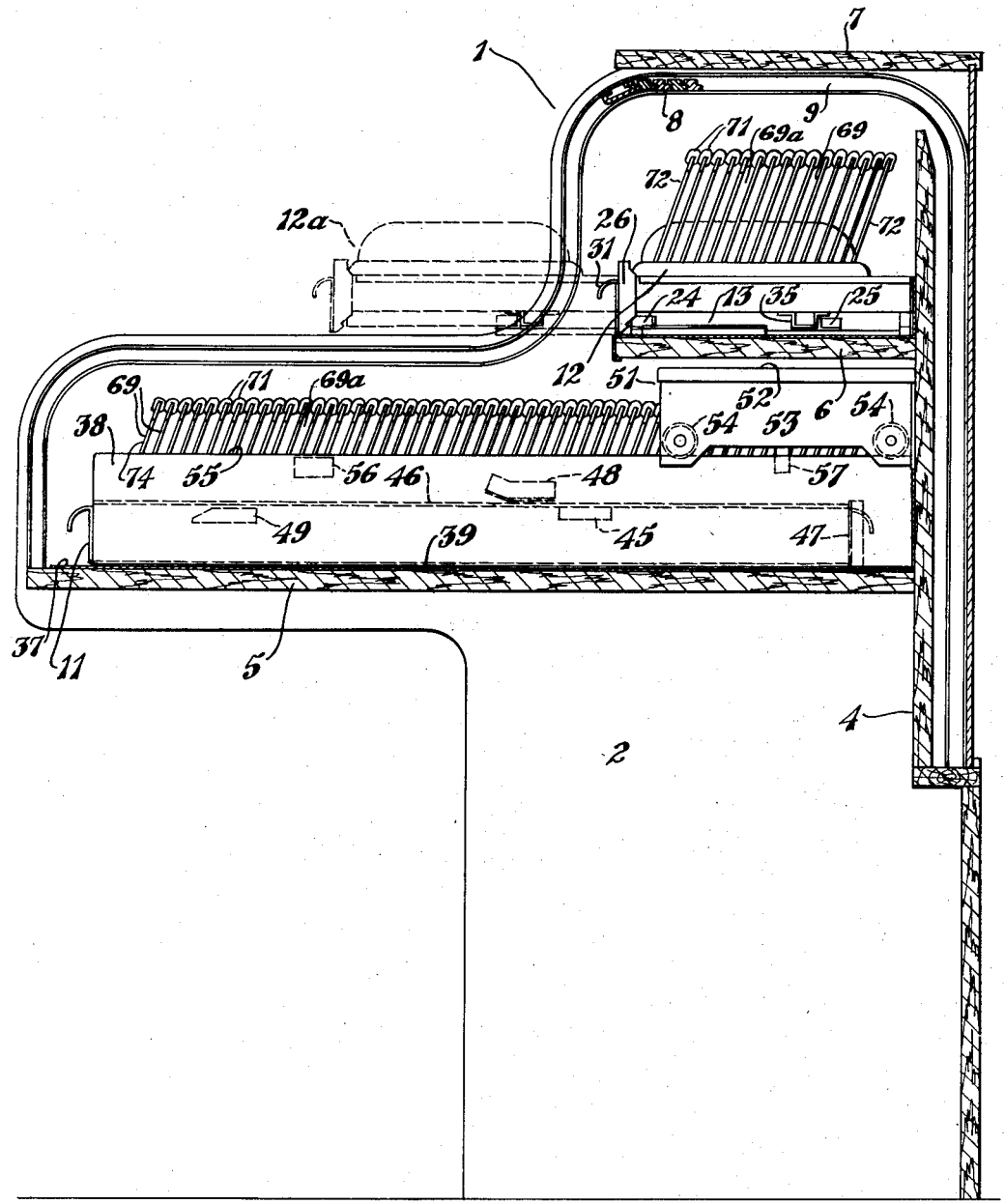
Fig. 2 is a vertical section taken as on the line 2—2, Fig. 1.

The generally rectangular table 5 at one side has an overhanging cantilever-type longitudinally extending portion which terminates in a side edge at which the operator is seated. This overhanging longitudinally extending portion is unobstructed from below, as shown in Fig. 2 so that the legs of an operator seated adjacent said side edge may be located below the overhanging unobstructed portion. The overhanging, longitudinally extending portion of the table 5 is also unobstructed from above, as shown in Fig. 2, so that free vision and access may be had by a seated operator to trays mounted thereon in a manner later described.

A first series of lower trays 11 (Figs. 12 and 13) are mounted for sliding movement on the table member 5 and are arranged side by side thereon.

A second series of upper trays 12 (Figs. 10 and 11) are mounted for movement on the shelf member 6 and are arranged side by side thereon.

For illustrative purposes, eight trays 11 and eight trays 12 are shown mounted respectively on the table member 5 and shelf member 6. This number of trays for housing cards of convenient width may be arranged on the table and shelf members 5 and 6 so that all cards therein may be reached by an operator seated centrally in front of the appliance. However, it is to be understood that if cards of different width are desired, the width of the trays 11 and 12 will be varied. Thus, the number and width of trays in an improved filing appliance may be varied within the scope of the invention to locate such trays and their contents all within reach of a seated operator. Likewise any desired number of trays may be mounted on the shelf of one unit.

The right hand tray 11 on table member 5 has been omitted in Figs. 1 and 14 for illustrative purposes, and the third tray from the right in Fig. 14 is shown in an extended position.

Figure 3:
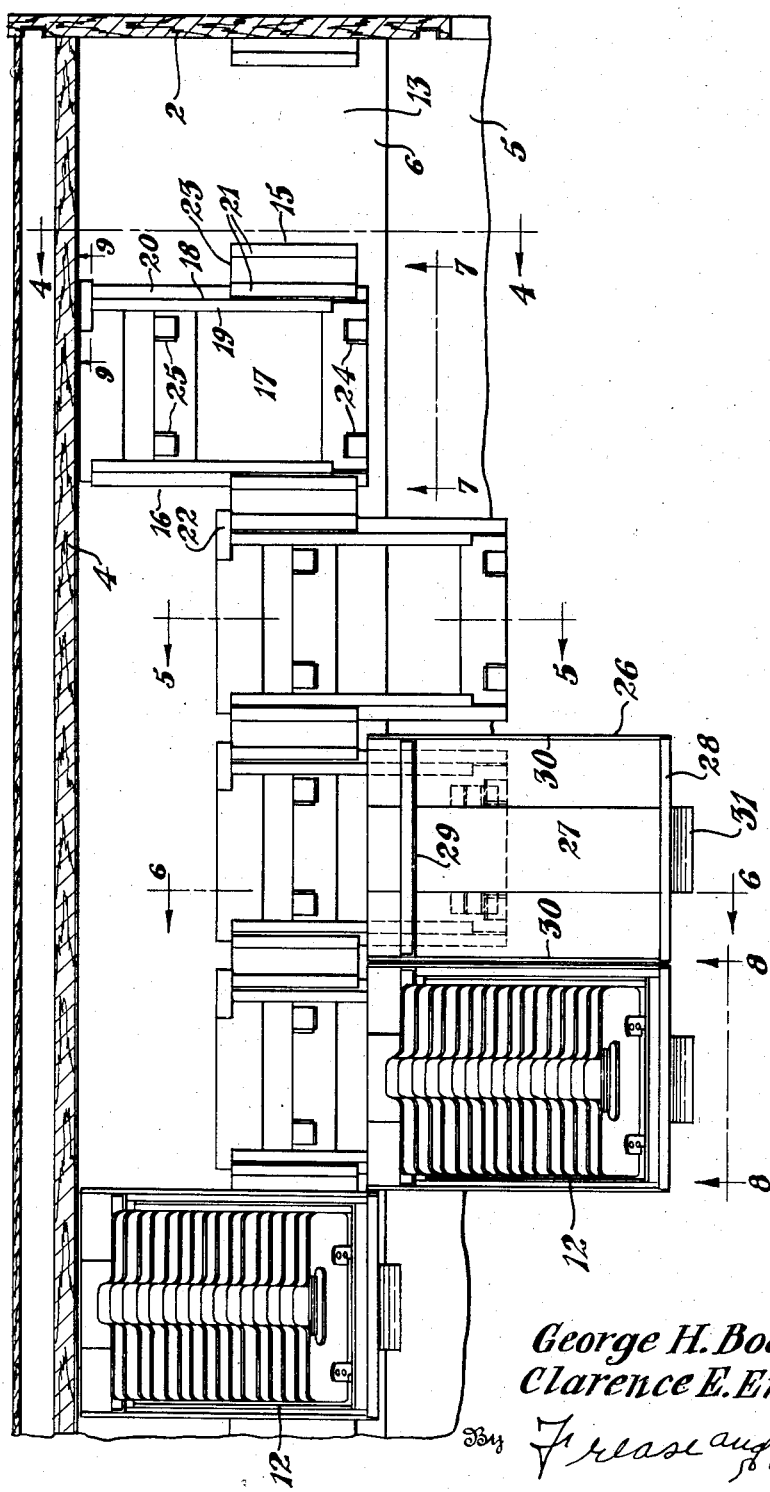
Fig. 3 is a plan section taken as on the line 3—3, Fig. 1, illustrating the construction and arrangement of the trays and drawers mounted on the shelf member of the filing appliance.

The first four trays 12 to the right on the shelf member 6 have been omitted in Figs. 1 and 3 for illustrative purposes and the fifth tray from the right is shown in extended position. Likewise, everything has been removed from the first tray-way at the right of Figs. 1 and 3; the pan suspension only is shown in the second tray-way from the right in retracted position in Fig. 3; the pan suspension only is shown in the third tray-way from the right in extended position in Fig. 3; and the drawer is shown on the extended pan suspension in the fourth tray-way from the right in Figs. 1 and 3.

Referring to Figs. 1 through 11, an individual tray-way 13 is provided for each upper tray 12 on shelf member 6. The trays 12 are mounted for sliding movement in the tray-ways 13 longitudinally of the trays to projected positions above central portions of the corresponding trays 11 on the table member 5 immediately below as shown in Fig. 3 and in dot-dash lines at 12a in Fig. 2.

The shelf member 6 is preferably covered with a sheet metal support or liner member 14 to which flanged channel-shaped slide guides 15 are secured at spaced intervals, as by spot welding, to form the tray-ways 13. A pan suspension member 16 is slidably mounted in each tray-way 13 and includes a base member 17 and longitudinal side members 18 formed with inturned flanged drawer slides 19.

The side members 18 of each pan suspension member 16 are spaced inward of the side edges of the base member 17 so as to form edge-slides 20 on each pan suspension 16 which are received within and slide in recesses formed by the flanges 21 on slide guides 15. Each pan suspension member 16 is movable from retracted position illustrated in Fig. 4 to extended position illustrated in Fig. 5.

A stop member 22 may be provided at one rear corner of each pan suspension member 16 for engaging the rear end 23 of an adjacent slide guide 15 to limit projected movement of the pan suspension member 16 (Figs. 3, 4, 5 and 9). Two spaced front drawer-block members 24 project upward at the front end of the base member 17 of each pan suspension member 16, and two similar upwardly projecting drawer-blocks 25 are mounted near the rear end of each pan suspension member 16.

A drawer member 26 is mounted on each pan suspension member 16 and each drawer 26 preferably includes a bottom wall 27, a front wall 28, a rear wall 29 and side walls 30, forming a top opening drawer. A handle 31 may be provided on the front wall 28 of each drawer 26.

The bottom wall 27 of each drawer 26 preferably is formed with a central longitudinal channel recess 32 received between the blocks of each pair of drawer-blocks 24 and 25; and drawer retainer members 33 are secured to the underside of each drawer and have their free edges 34 engaged under the flanges 19 on pan suspension members 16 for retaining each drawer 26 on its pan suspension member 16.

Normally, the bottom wall 27 of each drawer 26 slides on the drawer slides 19 of a pan suspension member 16. Block bumpers 35 are formed on the underside of the bottom wall 27 of each drawer 26, adapted for engagement with the drawer-blocks 24 or 25 on a pan suspension member 16.

As any drawer 26 in retracted position is pulled outward by grasping handle 31, it slides on pan suspension drawer slides 19 until bumpers 35 engage front drawer-blocks 24 on pan suspension member 16, thus pulling pan suspension member 16 outward so that edge-slides 20 slide in recesses formed by guide flanges 21 until stop member 22 on the pan suspension member engages the rear end of guide 15 to limit further projection of the drawer 26. When it is desired to return drawer 26 to retracted position, the handle 31 is pushed and drawer 26 slides on drawer slides 19 of pan suspension member 16 until bumpers 35 engage rear drawer-blocks 25, when pan suspension member 16 is also pushed inward to fully retracted position.

Figure 10:
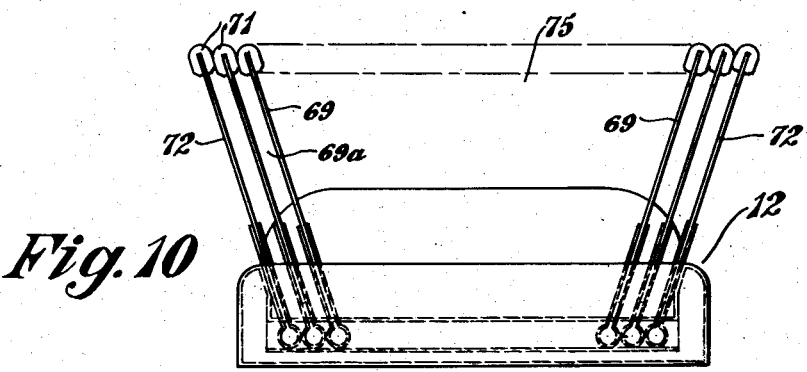
Fig. 10 is a side elevation of one of the short upper trays.
Figure 11:
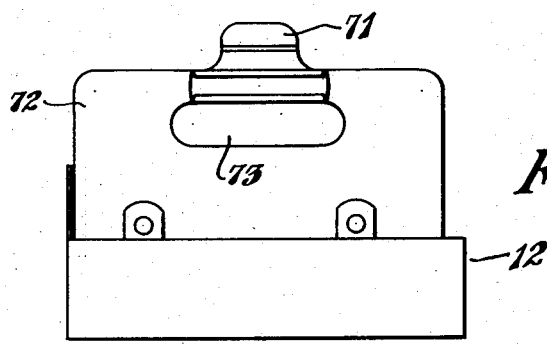
Fig. 11 is a front end view thereof.

Each top opening drawer 26 is adapted to removably receive, support and hold an upper card tray 12, such as illustrated in Figs. 10 and 11, to be later described more in detail.

Referring to Figs. 1, 2 and 12 through 19, an individual tray-way 36 is provided for each lower tray 11 on table member 5. The trays 11 are mounted for sliding movement in tray-ways 36 longitudinally of the trays to projected positions as shown in Fig. 14.

The series of top opening card trays 11 which are mounted side by side on the table member 5 also move laterally of the side edge of the longitudinally extending overhanging table portion so as to project a front portion of any such tray beyond said side edge.

The table member 5 is preferably covered with a sheet metal support or liner member 37 to which longitudinal partition members 38 are secured at spaced intervals, as by spot welding bottom flanges 39 thereof to the liner member 37, to form the tray-ways 36.

A tray member 11 is mounted in each tray-way 36 and preferably includes a bottom wall 40, and side walls 41 and 42 (Figs. 12, 13 and 19); and the bottom side edges of each tray 11 are preferably formed with flanges 43 and 44 adapted to rest or slide on the bottom flange 39 of adjacent partition members 38. The side member 42 of each tray 11 is preferably provided with a stop member 45 approximately two-thirds of the distance to the rear end of the tray; and said side member 42 is also preferably provided with an upper outwardly projecting flange 46.

Each partition member 38 is provided, on its side adjacent the side wall 42 of each tray, with a rear stop 47, an anti-tilt stop 48, and a front stop 49. Normally, each tray 11 is in retracted position in its tray-way 36 and rearward movement thereof is limited by abutment between the rear end of the tray and rear stop 47. This position is illustrated in Fig. 2.

When it is desired to gain access to the rear portion of any tray 11, which is located beneath shelf member 6, the tray member 11 is pulled outward and slides in its tray-way 36 until the stop member 45 on the tray engages the front stop 49 on partition member 38 as shown in full lines in Fig. 17. In this position, the rear end of the tray 11 is clear of shelf member 6. Since the forward end of the tray is unsupported in this position, means must be provided for preventing drop-tilting of the tray; and this is accomplished by abutment between the anti-tilt stop 48 on partition member 38 and the outturned flange 46 on tray 11, if a tendency occurs to tilt the front end of tray 11 downward and the rear end upward.

When it is desired, for a purpose to be later described, to remove any tray 11 from its tray-way 36, with the tray in the position shown in full lines in Fig. 17, the front end thereof may be raised so that tray stop member 45 clears or disengages front stop 49 on partition member 38 as shown in dot-dash lines in Fig. 17, thus permitting complete removal of the tray 11. In order to provide necessary clearance, the anti-tilt stop 48 is tapered upwardly as indicated at 50.

The filing appliance 1 is preferably provided with a movable table or platform 51 having a work space 52 and downturned side flanges 53 on which wheels 54 are mounted. The table 51 is preferably of such size that it spans any two adjacent tray ways 36 and the wheels 54 are adapted to ride on the upper edges 55 of partitions 38.

The movable table 51 may be pushed back to a storage position beneath shelf member 6 as indicated in Fig. 2 when not in use or when it is desired to close the roll top 8 of the appliance; or it may be rolled forward above any selected tray for use. Forward movement of the table 51, so that it does not roll off of the appliance, may be controlled by providing a stop 56 on each partition member 38 engageable with a similar stop 57 projecting downward from at least one side flange 53 of the movable table member 51.

Figure 12:
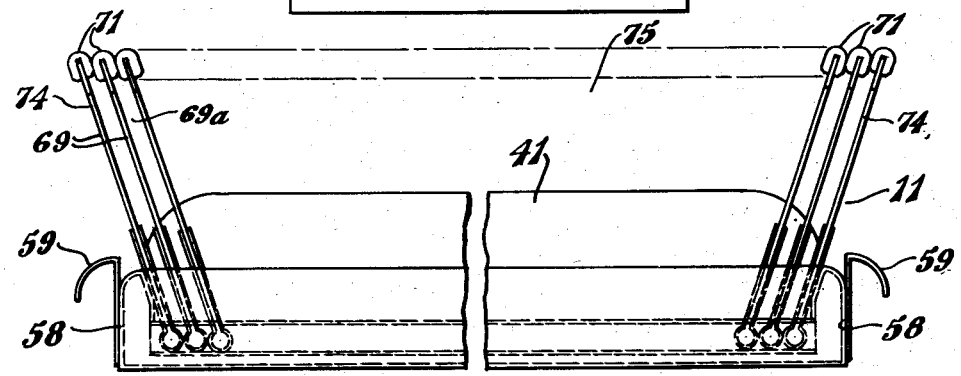
Fig. 12 is a view similar to Fig. 10 of one of the longer lower trays.
Figure 13:
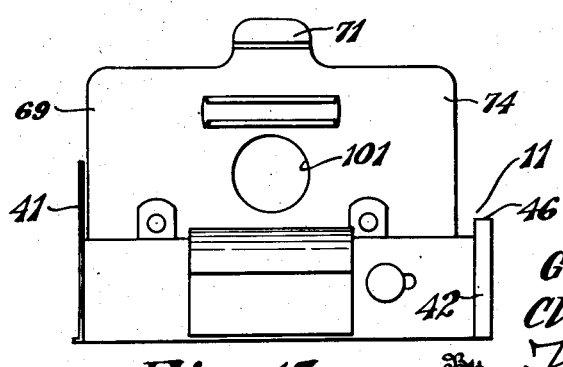
Fig. 13 is a front view thereof.

Referring to Figs. 12, 13 and 19, each lower tray 11 is provided with end walls 58 having handle formations 59 thereon. The bottom wall 40 of of each tray 11 is formed with longitudinal slot openings 60, 61 and 62 which communicate respectively with side channel recess 63, central channel 64 and side channel recess 65. A card locking rod 66 may be mounted in central channel 64 and pivot projections 67 extending below the bottom edges 68 of card divider members 69 may be retained, normally against removal, in side channels 63 and 65 as shown in Fig. 19. A locking bar 70, or any other suitable means, may be provided for holding dividers 69 in retained position. Upon removal of locking bar 70, dividers 69 may be moved to the right (Fig. 19) whereupon dividers 69 may be raised and pivot projections 67 will pass out through openings 60 and 62.

Knobs 71 are formed preferably centrally at the upper edge of each divider 69 and each knob 71 preferably has the same width as the diameter of the pivot 67 on each divider so as to maintain a cavity or space 69a between adjacent dividers 69 of approximately uniform thickness throughout as the dividers 69 are rocked back and forth on pivots 67 when fanning the dividers.

The construction of the upper trays 12 shown in

Figs. 10 and 11 is somewhat similar to the construction of the lower trays 11 shown in Figs. 12 and 13 except that the upper trays 12 are considerably shorter than the lower trays 11 and no handles are provided on the end walls of the short trays 12. Instead, the end dividers 72 of each tray 12 may be formed with a hand hole opening 73 for gripping the tray 12 to carry it from place to place.

Although certain details of construction of the trays 11 and 12 have been shown and described herein, the tray construction in detail, per se, forms no part of the present invention but is shown, described and claimed in the copending application of John H. Talmage and Robert W. Finley for Filing Appliance filed March 2, 1946, Serial No. 651,564.

Each tray 11 and 12 is filled throughout its length with dividers 69 as shown in Figs. 2, 10, 12, 27 and 28; and the dividers 69 may be formed of heavy, stiff cardboard or the like, so as to be relatively rigid. The front and rear dividers 74 in trays 11 and the front and rear dividers 72 in trays 12 are preferably mounted on fixed pivots, while the remaining intervening dividers 69 in each tray 11 and 12 are preferably removable as described above. Forward pivotal movement of front dividers 72 and 74 in trays 12 and 11 is limited by abutment of the divider card against the upper edge of the front wall of its tray, as illustrated in Figs. 10 and 12; and rearward pivotal movement of the rear dividers 72 and 74 in trays 12 and 11 is limited by abutment of the divider card against the upper edge of the rear wall of its tray, also illustrated in Figs. 10 and 12.

Thus, the intervening dividers 69 in each tray 11 and 12 may each be moved through an arc from an angled position parallel with the forwardly angled position of a front divider to a rearwardly angled position parallel with the angled position of a rear divider. Such movement of any divider or any group of dividers 69 may be accomplished by moving the knob 71 at the top of any divider with the thumb or finger or both. When any two adjacent dividers 69, 72, and 74 are angled with respect to each other, a V-opening generally indicated at 75 in Figs. 10, 12 and 26 is provided. This construction and arrangement is shown somewhat diagrammatically in an exaggerated manner in Fig. 26 so as to illustrate different types of cards which may be filed between adjacent dividers 69.

Index cards of a somewhat usual type are located and edge-mounted in each of the trays 11 and 12 in the cavities or spaces 69a between adjacent dividers, such index cards being indicated at 76 in Figs. 26 and 29. The index cards 76 each preferably have approximately the same size as the dividers 69 but are formed at the bottom with a locking tab 77 (Fig. 29) and at the top with an index tab 78 in any one of several positions. The index tabs 78 extend upwardly above the top edges of the dividers 69 but below the top edges of the knobs 71 and on either side of said knobs. The locking tabs 77 extend downward into the central recess of each tray such as the channel 64 of tray 11 (Fig. 19) and are engaged by locking rod 66 passing through apertures 79 in index card locking tabs 77. Thus, the index cards 76 are semi-permanently mounted in the trays but may be removed if desired for expansion of the index breakdown or for any other purpose, as by removing locking rod 66 or by providing a split 80 in the locking tab 77.

Individual charge accounts may be filed and indexed in trays 11 and 12, and each individual account comprises two cards illustrated in Figs. 20 and 21. A first and preferably front card of each individual account structure is indicated at 81 in Fig. 20, and the second preferably rear card of each individual account structure is indicated at 82 in Fig. 21. The card 81 may constitute the credit application for the individual account and may contain a record of the usual information desired when a customer opens a charge account at a store.

Each card 81 preferably has a height from bottom edge 83 to top edge 84 shorter than the height of card 82 from bottom edge 85 to top edge 86 and shorter than the height of index cards 76 and dividers 69. A locking tab 87 projects downward from the bottom edge 83 of each card 81 and is formed with a hole 88 and a slit 89 for being received by and locked by locking rod 66 in any tray. The card 81 is semi-permanently edge-mounted in any tray, initial mounting being accomplished by the provision of the slit 89. The lower edges 83 of each card 81 ride on the bottom wall of any tray 11 or 12.

The other card 82 of each card account structure may constitute the credit history or transcript ledger card for the particular account and may have the necessary form printed thereon for recording credit information. The card 82 of each account structure is edge-mounted and normally removable and preferably has the same form printed on both sides thereof so that when the form spaces on one side are exhausted, the card 82 may be turned end for end for recording continued ledger information upon the other side. Preferably the two top corners 90 and 91 of each card 82 have some special signal indicia such as having a rounded shape or configuration as shown in Fig. 21, and preferably the upper left hand top corner on each side of the card 82 is further marked with some signal indicia such as indicated at 92. The bottom corners 93 and 94 of each card 82 are preferably shaped differently than the top corners 90 and 91 thereof with some special indicia configuration such as an angled cut corner as shown in Fig. 21.

The height of each card 82, as previously stated, is greater than the height of card 81; and the height of card 82 is preferably the same as the height of index cards 76 and dividers 69. The bottom edges 85 of cards 82 rest on the bottom walls of trays 11 or 12 when the cards 82 are turned right side up; and the top edges 86 of cards 82 rest on the bottom walls of trays 11 or 12 when the cards 82 are turned upside down.

As shown in Figs. 1, 2, 12, 26, 27 and 28 the dividers 69, the index cards 76 and the account cards 81 and 82 all extend upward in the trays 11 above the tops of the tray side walls 41 and 42 and end walls 58 and above the tops of the partition members 38. Thus, referring to Figs. 27 and 28, the cards 81 and 82 are accessible in an unobstructed manner from the front ends of the trays 11 to an operator seated as shown, for inspection, manipulation, fanning and stuffing.

A preferably central elongated aperture 95 is provided in each card 82 with its bottom end spaced the same distance 96 from the bottom edge 85 as its top end is spaced as indicated at 97 from the top edge 86 of the card 82. The side edges of each opening 95 are spaced the same distance from the side edges of the card 82. Thus, the opening 95 has the same relative location whether the card 82 is turned end for end or upside down.

Each card 81 is provided with an opening 98 preferably similar in shape to the opening 95 in card 82 and the bottom of opening 98 is spaced the same distance 99 from the bottom edge 83 of card 81 as the spacing 96 or 97 for card 82. The opening 98 is also located centrally between side edges of its card 81. Thus, the openings 95 and 98 will always register and be aligned regardless of whether or not card 82 is turned end for end or upside down.

If desired, the openings 95 in cards 82 may be offset to the right or left and the openings 98 in cards 81 are similarly offset so as to be aligned therewith. Thus, the openings in cards 82 will register if the card is turned upside down.

Each index card 76 is also provided with an opening 100 which may have the same shape, size and location as the openings 95 and 98 or may have a larger size such as by being a circular opening as shown. Thus, the openings 100 in index cards 76 register with openings 95 and 98. Likewise, each divider 69 is provided with an opening 101 (Fig. 19), preferably of the same size and shape as the openings 100 in index cards 76.

Figure 27:
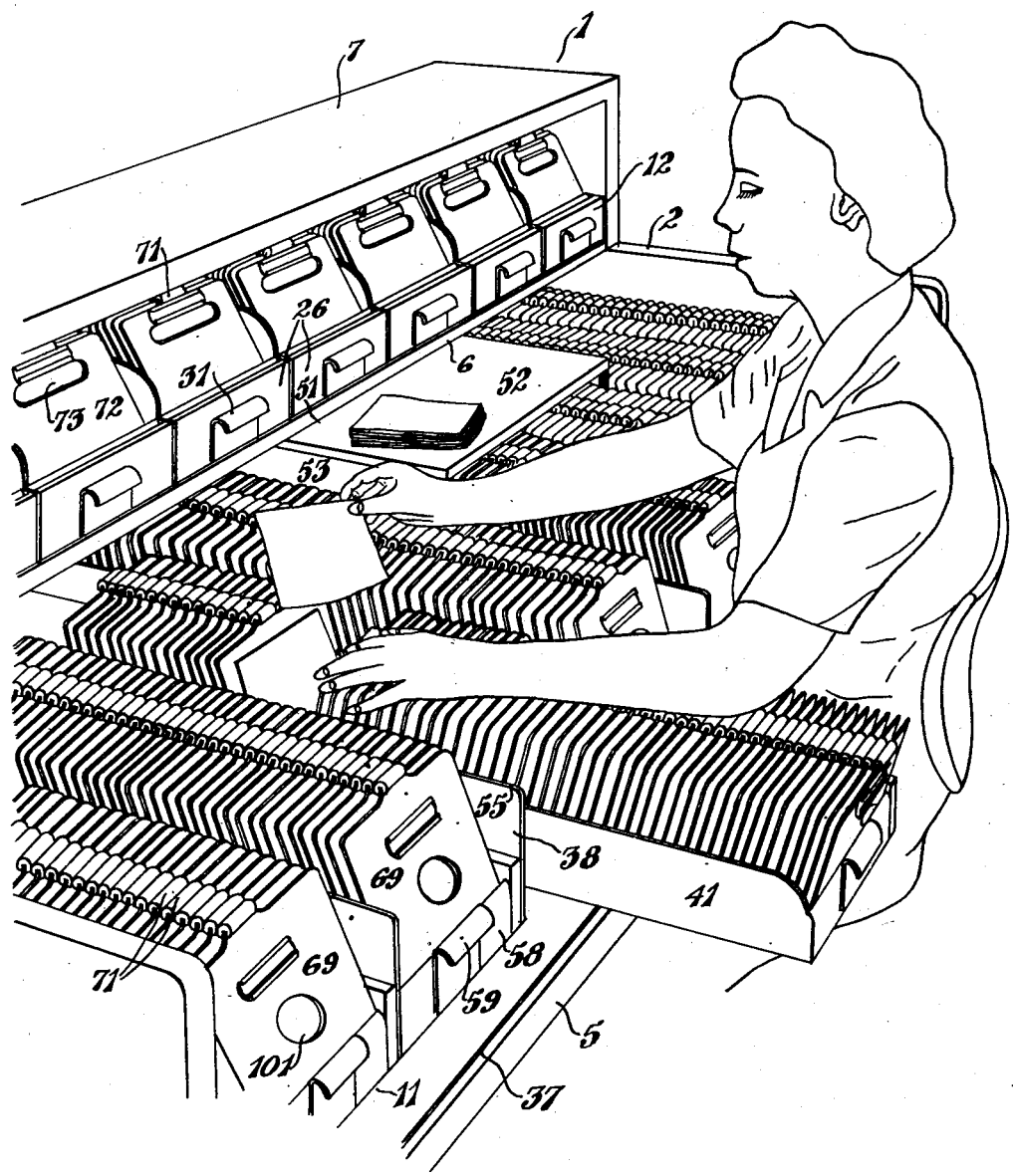
Fig. 27 is a perspective view of the improved filing apparatus illustrating an operation of stuffing material into an individual active account in one of the lower trays of the improved filing appliance.
Figure 28:
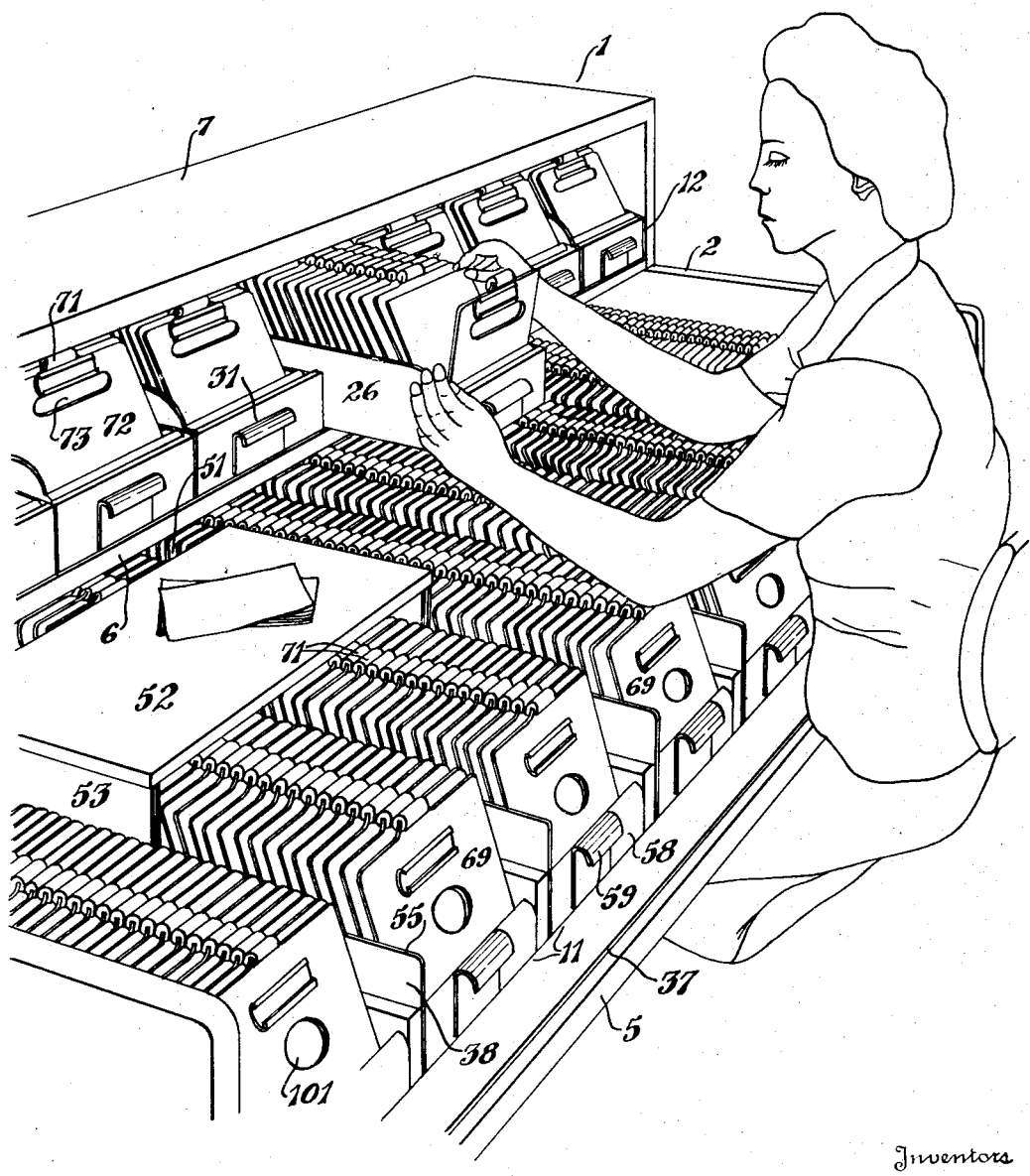
Fig. 28 is a view similar to Fig. 27 illustrating an operation of locating an inactive account in one of the upper trays of the improved filing apparatus.

By these means, when any tray 11 or 12 is filled with dividers 69, index cards 76, and account cards 81 and 82, but nothing else, a central channel runs entirely through all material in such tray, provided by the aligned openings 95, 98, 100 and 101 which are located above the tops of the tray end walls 58 as shown in Figs. 1, 27 and 28. Thus, any tray may be tilted so as to sight or look through such channel from the front end of the tray to detect the presence of any other material in the tray excepting the dividers, index cards and account cards.

When it is desired to stuff any material such as a sales slip or a credit slip or other memorandum or an invoice head, into any particular individual account, the two cards 81 and 82 of such account may be opened up to form a V-opening 102 (as illustrated in Fig. 22) between the cards 81 and 82 of the individual account selected. The V-opening 102 is formed by finding the general location of the particular account through the index tabs on index cards 76 and by then fanning the dividers, index cards and account cards to present the opening.

The V-opening 102 will readily receive any material to be stuffed such as sales slips indicated at 103 in Fig. 23, which are merely dropped into the V-opening 102 by the simplest top filing operation.

In Fig. 24, the stuffed material for a particular account is shown as including sales slips 103, a credit slip 104, and an invoice head 105. Fig. 25 illustrates the manner in which a ledger card 82, sales slips 103, credit slips 104 and an invoice head 105 may be collectively picked up and removed from any tray at a bookkeeping or billing machine by the simplest operation, leaving the semi-permanently mounted account card 81 in the tray for keeping the account location for the ultimate return of the ledger card 82 to the account.

The operation and use of the improved filing apparatus will be described below with reference to the use of the cycle billing system or procedure in a large depeartment store. In such a store, the filing apparatus may comprise a number of desk units such as shown in Fig. 1, normally with one operator for each unit. Active accounts are filed in the lower trays 11 of each unit and inactive accounts are filed in the upper trays 12. Normally, the index section or range for each upper tray 12 corresponds to the index range of the lower tray 11 immediately below. Normally the lower trays 11 are in retracted position and are only filled with accounts from the front of each tray back to a position approximately under the front edge of the shelf member 6.

Sales slips or other material received in the filing department are first rough sorted or rough and fine sorted and the group of slips for any filing appliance unit 1 is distributed to the operator of that unit, who may pile such slips on the movable table 51 as shown in Figs. 27 and 28. The indexes for all lower trays 11 on table member 5 are all normally visible on one level to the operator who may readily instantly locate the tray and general location in the tray of the account for the sales slip on the pile on table 51 to be filled. The operator then reaches to the particular index range for the account, fans the dividers 69 and then locates the specific account and forms V-opening 102 therein such as illustrated in Fig. 22. This operation is also illustrated in Fig. 27 except that normally it is unnecessary to pull any tray 11 to an extended position such as there shown.

However, in case the account is located in a rearmost portion of a tray, such as when the trays have been expanded during peak seasons, it may be necessary to pull the tray 11 out to an extended position such as shown in Fig. 27 in order to form the V-opening for the account within easy reach while the operator remains seated.

After the particular individual account has been found, the operator drops the sales ticket into the account and the filing operation is thus completed.

In using the cycle billing procedure, no computations are ordinarily made and no entries of the sales slips are made on the account cards but the sales slips are merely stored in their respective accounts until the billing date for such accounts.

If it is necessary, however, to make any written entries on any account card, the removable card 82 may be readily removed and placed on movable table 51 where the entry may be made by writing in a normal table top manner.

Because of the full V-opening 102 formed for any account when depositing any material being stuffed, a visual comparison of the account name on either or both cards 81 and 82 and on the stuffed material may be made by the operator, since both surfaces of either card 81 or 82 may be fully exposed to the view of the operator by the V-opening.

Accordingly, all active accounts in the lower trays 11 are normally available and subject to visual index inspection on one level for locating any such account. Each tray 11 may be pulled out to extended position to render additional space available at the back end thereof during peak seasons or for any other purpose. Thus, all tops of all active account trays are available or visible either normally or when the trays are pulled out. Also, all tops of all active account trays 11 are unobstructed from above excepting the back one-third ends of the trays, which when in retracted position are below shelf 6, but which are unobstructed from above when the trays are pulled out. This absence of any obstruction from above permits free access to any part of any active account tray by a seated operator.

Inactive account file space is located immediately above the files for active accounts in an accessible position, contrary to usual practice in prior filing equipment, in which inactive accounts are usually stored at a remote place.

As the operator comes to a sales slip and is unable to find an account therefor in the active file trays 11, the operator then can immediately look in the same relative location in an upper tray 12 by pulling out the drawer therefor as illustrated in Fig. 28. The account card structure for the inactive account thus located may then be readily and quickly transferred from the upper tray 12 to a lower tray 11 in the proper indexed location and the sales slip deposited between the two cards 81 and 82 of such account.

Credit slips 104 or other material to be stuffed may be filed in active accounts in the same manner as described above in connection with the filing of sales slips.

As shown in Fig. 27, the knobs 71 at the tops of stiff dividers 69 serve as an arm rest for the operator while finding and stuffing accounts; and the dividers also protect the cards while the knobs protect the index tabs.

Near the end of any billing period for a particular group of accounts, the operator may quickly run through all of the accounts in the group and upon finding any account which has not been active for the particular period, may turn the card 82 thereof upside down so as to expose at the top, the different corner formations 93 or 94 which serve as a visible signal or indicia of account inactivity.

On the billing date for a particular group of accounts, the operator may run off a series of invoice blanks on an addressograph machine, the operation of which should be arranged like the index arrangement for the active accounts in trays 11. These addressed invoice blanks may then be stuffed consecutively in all active accounts in trays 11; the upside down cards 81 signalling account inactivity and indicating to the operator that no invoice blank should be stuffed to such account.

The trays 11 are then removed from the appliance 1, normally one at a time, and carried by grasping handles 59, or by any other suitable means of transportation, to the bookkeeping department where individual trays 11 are worked one at a time by a bookkeeping and billing machine operator.

This characteristic or feature of the present invention is important and results in a substantial saving in time and effort. Heretofore in prior devices, it has been necessary to strip files of active accounts and transfer them to a transfer tray which is carried to the bookkeeping department and after completion of the billing operation, individual accounts are returned to the transfer tray, then to the file stack and must be again individually filed in the filing appliance.

The billing operation is very simple as the operator does not have to find active accounts. The stuffed invoice blanks indicate account activity and the work may progress for any tray 11 from front to rear, one account at a time as indicated by an invoice blank. The bookkeeping machine operator simply removes the ledger card and stuffed material for each active account as illustrated in Fig. 21.

The purchases indicated by the sales slips may be tabulated on the bookkeeping machine, credits may be tabulated, the totals entered on the ledger card 82, and the items and totals entered on the invoice blank. The stuffed material is then normally assembled with the invoice and mailed to the customer.

The ledger card is then returned to its proper place in the tray 11 indicated by the account card 81 which has remained in tray 11. The trays 11 are then transported back to the filing department and placed in their proper places in tray-ways 36 on a table member 5 of a filing unit 1.

Before returning any tray 11 to the filing department, the operator of the bookkeeping machine may tilt the tray and visually inspect the entire contents of the tray by sighting through the central channel in the cards and dividers to detect the presence immediately of any stuffed material still remaining in the tray which would cause a discrepancy in final balances.

Another important and characteristic feature of the present invention is the separate two-card arrangement of each account structure, one card 82 being readily removable from and the other card 81 semi-permanently mounted in a tray 11. Thus, when the ledger card 82 is removed at the bookkeeping machine, there is no possibility of mixing stuffed material in adjacent accounts. Likewise, the semi-permanently mounted card 81 holds the account location in the tray at the proper index place for the account.

However, some removability of semi-permanently mounted cards 81 is desirable so that two cards 81 and 82 may be removed from an active tray 11 to an inactive tray 12 when an account in an active tray has remained inactive for a considerable period of time, or for similarly transferring an account from an inactive tray 12 to an active tray 11.

Another important and distinctive feature of the present invention is the provision of aligned holes in all cards, indexes and dividers for any tray so as to enable instant visual inspection of the entire contents of any tray for the presence of overlooked stuffed material. In prior filing equipment for receiving stuffed material, if some stuffed material is overlooked, a search through or at least an inspection of every account, individually, must be made in order to locate stuffed material remaining in any particular account, after a discrepancy in balances has become evident on the bookkeeping machine.

Still another important and distinctive feature of the present invention is the ability to signal account inactivity in an active tray 11 by merely turning account card 82 upside down and without requiring the special operation of placing or attaching a special signal in place at the account.

Still another important and distinctive feature of the present improvements is the ease and speed with which any particular individual account may be located and stuffed by simply visually locating the particular zone of the account by glancing at the index tabs visible and accessible on one level, and by then fan opening the dividers and quickly locating the particular account by the same fanning procedure to form a V-opening for receiving the stuffed material.

In prior filing apparatus, the finding of any particular account and stuffing material therein normally requires the visual inspection of drawer indexes on many levels, the pulling of some drawer, the locating of an account therein, the opening up of the account, the tucking of the stuffed material into a pocket, the closing of account pockets, and the closing of a drawer.

Furthermore, the improved construction is characterized by the absence of any obstruction to proper vision when working on the active accounts. The active accounts are located within easy reach from a seated position on one level and are readily adapted for ideal conditions of lighting, ventilation and supervision. Furthermore, the absence of any obstruction above the active account cards in trays 11 which provides for complete vision, lighting and supervision also permits free movement of the arms of the operator to any position and to any account card location without hindrance.

Furthermore, the foregoing description of the construction, operation and use of the improved filing apparatus and individual account structure indicates the manner in which the cycle billing procedure may be carried out with a minimum of handling and without danger of loss of stuffed material so as to provide for time and error saving operations which facilitate the efficient operation of the equally time and error saving cycle billing procedure.

Fundamentally, the foregoing results are accomplished by providing mobility for an entire active tray so that it can be taken to the bookkeeping department; by locating active and inactive accounts adjacent each other; by the accessibility of all account cards with indexes therefor fully exposed on one level in top opening trays so that any individual account may be fully exposed by the mere operation of locating the account; by utilizing individual account structures which permit unlimited stuffing; and by providing dividers which may be shifted or removed at will so as to provide for necessary expansion during peak seasons.

Thus, approximately six hundred active accounts may be normally exposed to one operator in any tray, and approximately five thousand active accounts at any desk or unit are within easy reach of an operator without moving from a seated position.

Accordingly, the present invention provides improved constructions adapted for use in carrying out the cycle billing procedure which overcome inherent, existing, and unsolved problems and difficulties in prior art types of filing appliances which have prevented the attainment of the full benefits of the cycle billing procedure; provides improved constructions having one or more or all of the characteristics referred to above; provides improved constructions which satisfy the objects and desiderata hereinafter enumerated; and provides an improved filing appliance and an improved account structure for keeping and filing card type accounts which have a simplified construction and arrangement, which may be readily manufactured and assembled by the simplest of operations, and which are durable and effective in use.

It is to be understood that the improved apparatus and card structures may be used for other purposes than in connection with the cycle billing procedure, or in other places than department stores. Thus, the present improvements may be used as time and error saving equipment for filing certain insurance company records or for inventory control and the like in many businesses.

The embodiments of the present improvements illustrated and described herein are by way of example, and the scope of the present invention is not limited to the exact details of construction of the various parts.

Finally, in the foregoing description, certain terms have been used for brevity, clearness and understanding; but no unnecessary limitations are to be implied therefrom beyond the requirements of the prior art, because such words are used for descriptive purposes herein and not for the purpose of limitation, and are intended to be broadly construed.

Thus, the word "fanning" is used herein and in the appended claims to indicate an operation of shifting dividers, index cards and account cards from a rearwardly angled position to a forwardly angled position or vice-versa to provide a V-opening between any such elements and includes the operation of fingering any individual cards for finally selecting an individual account; also, the word "stuffing" as used herein and in the appended claims refers to the operation of introducing any media or material such as sales slips, credit slips, invoice blanks or the like into any individual account for temporary storage; the words "drop-tilting" as used herein and in the appended claims refer to the upsetting or dropping of a lower tray by tilting when in or pulled to projected position, if unrestrained by some retaining means; and the words "account structure" as used herein and in the appended claims refer to the cards and mounting means therefor which make up any individual account.

Having now described the features of the invention, the construction, operation and use of preferred embodiments thereof, and the advantageous, new and useful results obtained by the improved card index type account filing appliance and the improved card type account structure; the new and useful devices, arrangements, elements, parts, constructions, combinations, subcombinations, filing appliances, and account structures, and reasonable mechanical equivalents thereof, obvious to those skilled in the art, are set forth in the appended claims.

We claim:

1. In a filing appliance, a generally rectangular table member having at one side an overhanging cantilever-type longitudinally extending portion unobstructed from below and above and terminating in a side edge, spaced partition members extending upward from said table member forming a series of side by side open-top tray-ways on the table member, said tray-ways extending laterally of said longitudinally extending table portion and having open front ends at said side edge, a series of open-top card trays removably mounted one each between two adjacent partition members for movement in said tray-ways longitudinally of said trays to project a front portion of any tray through said open front tray-way end beyond said side edge, and means adapted to edge-mount a plurality of cards and index means therefor in each tray, whereby the index means and tops of said cards are on one level visible and accessible in an unobstructed manner to an operator seated adjacent said side edge with the operator's legs located below said overhanging unobstructed table portion.

2. In a filing appliance, a generally rectangular table member having at one side an overhanging cantilever-type longitudinally extending portion unobstructed from below and above and terminating in a side edge, spaced partition members extending upward from said table member, a series of open-top card trays removably mounted one each between two adjacent partition members side by side on said table member for movement longitudinally of said trays and laterally of said longitudinally extending table portion to project a front portion of any tray beyond said side edge, stop means on the trays and partition members limiting longitudinal movement of each tray in each direction, and means adapted to edge-mount a plurality of cards and index means therefor in each tray, whereby the index means and tops of said cards are on one level visible and accessible in an unobstructed manner to an operator seated adjacent said side edge with the operator's legs located below said overhanging unobstructed table portion.

3. In a filing appliance, a generally rectangular table member having at one side an overhanging cantilever-type longitudinally extending portion unobstructed from below and above and terminating in a side edge, spaced partition members extending upward from said table member, a series of open-top card trays removably mounted one each between two adjacent partition members side by side on said table member for movement longitudinally of said trays and laterally of said longitudinally extending table portion between a retracted position and a position in which a front portion of any tray projects beyond said side edge, means on the trays and partition members engageable to maintain any tray in any position thereof against drop-tilting, and means adapted to edge-mount a plurality of cards and index means therefor in each tray, whereby the index means and tops of said cards are on one level visible and accessible in an unobstructed manner to an operator seated adjacent said side edge with the operator's legs located below said overhanging unobstructed table portion.

4. In a filing appliance, a generally rectangular table member having at one side an overhanging cantilever-type longitudinally extending portion unobstructed from below and above and terminating in a side edge, spaced partition members extending upward from said table member, a series of open-top card trays removably mounted one each between two adjacent partition members side by side on said table member for movement longitudinally of said trays and laterally of said longitudinally extending table portion to project a front portion of any tray beyond said side edge, stop means on the trays and partition members limiting longitudinal movement of each tray in each direction, the stop means limiting projected movement of any tray being disengageable to permit removal of such tray from the table member, and means adapted to edge-mount a plurality of cards and index means therefor in each tray, whereby the index means and tops of said cards are on one level visible and accessible in an unobstructed manner to an operator seated adjacent said side edge with the operator's legs located below said overhanging unobstructed table portion.

5. In a filing appliance, a generally rectangular table member having at one side an overhanging cantilever-type longitudinally extending portion unobstructed from below and above and terminating in a side edge, spaced partition members extending upward from said table member forming a series of side by side open-top tray-ways on the table member, said tray-ways extending laterally of said longitudinally extending table portion and having open front ends at said side edge, a series of open-top card trays removably mounted one each between two adjacent partition members for movement in said tray-ways longitudinally of said trays between retracted position and a position in which a front portion of any tray projects beyond said side edge, stop means on the trays and partition members limiting movement of each tray in each direction, means on the trays and partition members engageable to maintain any tray in any position against drop-tilting, the stop means limiting projected movement of any tray being disengageable to permit removal of such tray from said table member, and means adapted to edge-mount a plurality of cards and index means therefor in each tray, whereby the index means and tops of said cards are on one level visible and accessible in an unobstructed manner to an operator seated adjacent said side edge with the operator's legs located below said overhanging unobstructed table portion.

6. In a filing appliance, a generally rectangular table member having at one side an overhanging cantilever-type longitudinally extending portion unobstructed from below and above and terminating in a side edge, spaced partition members extending upward from said table member forming a series of side by side open-top tray-ways on the table member, said tray-ways extending laterally of said longitudinally extending table portion and having open front ends at said side edge, a series of open-top card trays removably mounted one each between two adjacent partition members for longitudinal movement in said tray-ways between retracted postion and a position in which a front portion of any tray projects beyond said side edge; each partition member being provided with a rear stop, an anti-tilt stop, and a front stop projecting into an adjacent tray-way; the rear end of a tray in such tray-way abutting against said rear stop to limit retracted movement of such tray in said tray-way; each tray being provided with an outwardly projecting flange adjacent said anti-tilt stop, and with a tray stop intermediate its ends; said tray stop being engageable with said front stop normally to limit extended movement of said tray; said projecting flange being engageable with said anti-tilt stop at all times when the tray is located at or between retracted and projected positions to maintain such tray against drop-tilting; the forward end of the tray being adapted to be lifted when the tray stop is engaged with said front stop to disengage abutment between such stop means and thereafter upon further projected movement of the tray to disengage said tray flange from engagement with said anti-tilt stop to permit removal of such tray from said table member; and means adapted to edge-mount a plurality of cards and index means therefor in each tray, whereby the index means and tops of said cards are on one level visible and accessible in an unobstructed manner to an operator seated adjacent said side edge with the operator's legs located below said overhanging unobstructed table portion.

7. In a filing appliance, a generally rectangular table member having at one side an overhanging cantilever-type longitudinally extending portion unobstructed from below and above and terminating in a side edge, spaced partition members extending upward from said table member forming a series of side by side open-top tray-ways on the table member, a series of open-top card trays removably mounted one each between two adjacent partition members for movement longitudinally of said tray-ways to project a front portion of any tray beyond said side edge, each tray being provided with a bottom wall and side and end walls projecting upward from the bottom wall, and means adapted to edge-mount a plurality of account cards and index means therefor in each tray with said cards and index means extending upward in said trays above the tops of the tray side and end walls and above the tops of said partition members, whereby the index means and tops of said cards are on one level visible and accessible in an unobstructed manner to an operator seated adjacent said side edge with the operator's legs located below said overhanging unobstructed table portion, and whereby cards mounted in the trays are accessible in an unobstructed manner from the front ends of said trays to an operator so seated for inspection, manipulation, fanning and stuffing.

8. In a filing appliance, a generally rectangular table member having at one side an overhanging cantilever-type longitudinally extending portion unobstructed from below and above and terminating in a side edge, spaced partition members extending upward from said table member forming a series of side by side open-top tray-ways on the table member, a series of open-top card trays removably mounted one each between two adjacent partition members for movement longitudinally of said tray-ways to project a front portion of any tray beyond said side edge, each tray being provided with a bottom wall and side and end walls projecting upward from the bottom wall, a series of dividers mounted in said trays, said dividers extending upward in said trays above the tops of the tray side and end walls and above the tops of said partition members, the dividers being provided with aligned openings above the tops of the tray end walls; and means adapted to edge-mount a plurality of cards and index means therefor having openings therein in said trays with said last mentioned openings aligned with said divider openings; whereby the tops of the index and account cards are on one level visible and accessible in an unobstructed manner to an operator seated adjacent said side edge with the operator's legs located below said overhanging unobstructed table portion; whereby the account cards are accessible in an unobstructed manner from the front ends of said trays to an operator so seated for inspection, manipulation, fanning and stuffing; and whereby said aligned openings form a sight channel extending entirely through the dividers and any cards and index means mounted in the trays which may be inspected from the front ends of said trays for detecting the presence of any stuffed material in the trays.

GEORGE H. BOCKIUS.
CLARENCE E. ERICKSON.

REFERENCES CITED

The following references are of record in the file of this patent:

UNITED STATES PATENTS

| Number | Name | Date |
|---|---|---|
| 677,786 | Meleney | July 2, 1901 |
| 945,252 | Upshaw | Jan. 4, 1910 |
| 1,121,330 | Davis | Dec. 15, 1914 |
| 1,369,255 | McKee | Feb. 22, 1921 |
| 1,381,305 | Hick | June 14, 1921 |
| 1,764,612 | Dickinson | June 17, 1930 |
| 1,952,117 | Casey | Mar. 27, 1934 |
| 1,982,504 | Elliott | Nov. 27, 1934 |
| 2,274,908 | Murray | Mar. 3, 1942 |
| 2,359,376 | Martin | Oct. 3, 1944 |
| 2,372,249 | Bruen | Mar. 27, 1945 |